United States Patent [19]

Henning et al.

[11] 4,121,640
[45] Oct. 24, 1978

[54] PNEUMATIC TIRE FOR A VEHICLE WHEEL

[75] Inventors: Hermann Henning, Hanover; Johannes Kosanke, Letter; Henryk Pakur, Bückeburg; Hermann Wittneben, Arpke; Reinhard Tiemann, Hemmingen, all of Fed. Rep. of Germany

[73] Assignee: Continental Cummi-Werke Aktiengesellschaft, Hanover, Fed. Rep. of Germany

[21] Appl. No.: 719,188

[22] Filed: Aug. 31, 1976

[30] Foreign Application Priority Data

Sep. 2, 1975 [DE] Fed. Rep. of Germany ....... 2538948

[51] Int. Cl.$^2$ .............................................. B60C 17/04
[52] U.S. Cl. .................................... 152/340; 152/158; 152/331; 152/400
[58] Field of Search ..................... 152/158, 339–342, 152/331, 399, 400

[56] References Cited

U.S. PATENT DOCUMENTS

| 3,085,615 | 4/1963 | Sanderson | 152/340 |
| 3,219,092 | 11/1965 | Howard | 152/340 |
| 3,225,811 | 12/1965 | Hawkes | 152/340 |

Primary Examiner—Drayton E. Hoffman
Assistant Examiner—Randolph A. Reese
Attorney, Agent, or Firm—Walter Becker

[57] ABSTRACT

A pneumatic tire for a vehicle wheel, according to which in the hollow chamber of the pneumatic tire there is arranged a hollow emergency ring or an emergency tube with one or more peripheral protrusions having running-up flanks which when moving into the respective flattened effective surface are substantially located in the elongation of an imaginary secant determined by the respective flattened effective surface.

7 Claims, 3 Drawing Figures

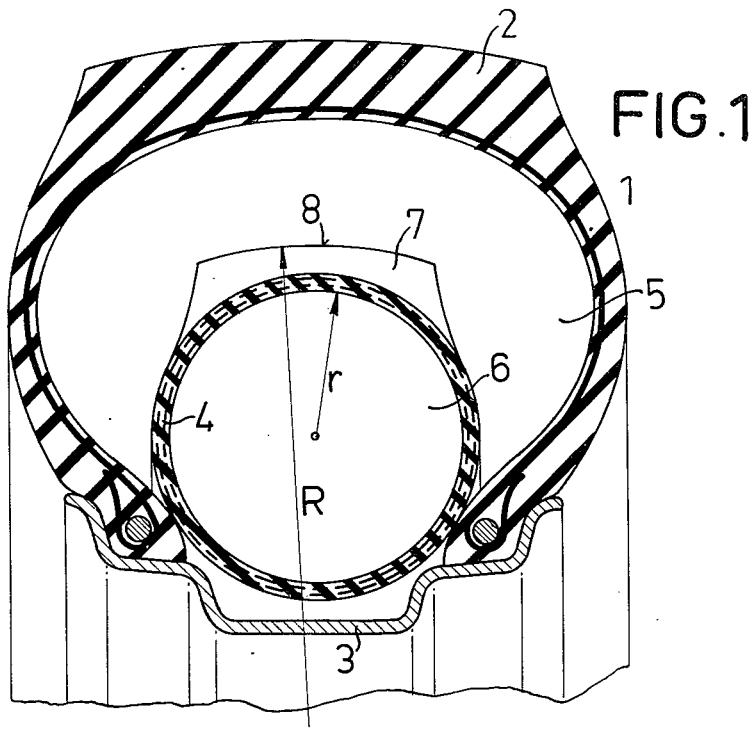
FIG.1
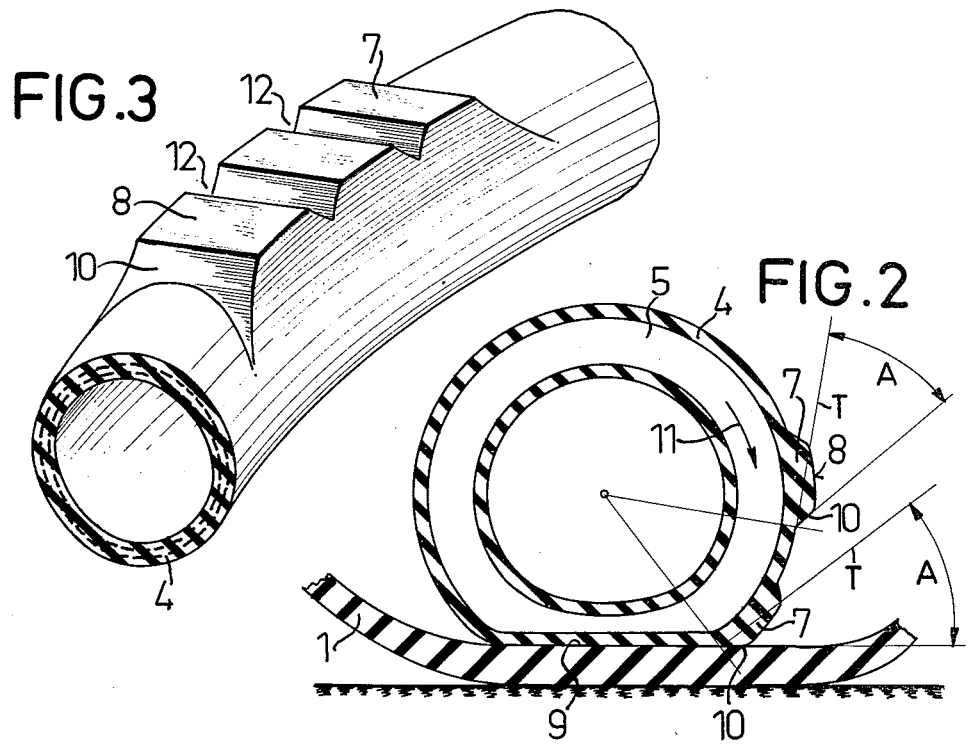
FIG.3
FIG.2

PNEUMATIC TIRE FOR A VEHICLE WHEEL

The present invention relates to a pneumatic tire for use in connection with a vehicle wheel, according to which a hollow emergency running ring is provided within a tubeless tire, which ring has its effective surface provided with one or more projections distributed over its circumference.

The purpose of these projections consists in warning the driver of the vehicle acoustically, and/or by vibrations. Such warning is of importance because the running period of an emergency running ring is limited and its operation may bring about changes in the behavior of the vehicle.

With heretofore known devices of the type involved, the flanks of the projections, which flanks are located in front and in the rear of the projections when viewing the tire in circumferential direction, have a relatively steep ascent so that when touching the ground to form the so-called bottom ellipse of the now effective emergency ring, contact occurs first by means of their front edge (viewed in the direction of rotation of the tire) relative to the inner surface of said tubular pneumatic tire. In connection therewith, a progressive deformation of the projection occurs. The effect intended by way of the acoustic or mechanical signal emission is therefore relatively slight.

It is, therefore, an object of the present invention so to improve tires of the above mentioned type that the mechanical shocks and/or acoustic signals are particularly strong and thus are easily felt.

This object and other objects and advantages of the invention will appear more clearly from the following specification in connection with the accompanying drawings, in which:

FIG. 1 represents a radial section through a vehicle wheel with a pneumatic tire according to the invention.

FIG. 2 represents a portion of the tire of FIG. 1 in section and more specifically within the region of the ground contact area.

FIG. 3 illustrates in perspective a portion of an emergency running ring.

The pneumatic tire according to the present invention is characterized primarily in that the running-up flank of the projections when moving into the flattened effective surface is arranged in or practically in the extension of the imaginary secant determined by the flattened area. When running into the standing area of the emergency ring, thus first the running-up flank of the projections in toto or practically in toto come into contact with the inner surface of the tubeless tire. Thereupon in a shock-like manner a contact is effected between that surface of the projections located at the outer circumference of the emergency ring, with the tubeless tire so that a correspondingly great mechanical shock or a correspondingly strong noise will occur.

When the emergency ring has not yet been pressed in, the angle of ascent of the running-up flank of the projections amounts to about from 20° to 50° relative to a tangent to the emergency ring, which tangent is determined by that root of the projections which in turning direction of the tire is located in front. This relatively flat ascent will then bring about the above mentioned arrangement in such a way that the running-up flank together with the flattened standing surface of the emergency ring will when seen from the side form a straight line or nearly a straight line.

It has been found particularly advantageous when the projections have a circumferential extension of from about 2 to 10% of the circumference of said ring while expediently with projections which are relatively long in circumferential direction of the tire a subdivision into two or a plurality of protuberances should be effected which are formed by transverse grooves.

Referring now to the drawing in detail, the tubeless pneumatic tire 1 with a tread strip 2 is arranged on a low bed rim. Within the hollow chamber of the tire there is provided an emergency device in the form of an emergency ring 4 which has an about circular or ellipse-shaped cross section, which consists primarily of rubber or rubber-like material and may be reinforced by fabric inserts or the like.

The connections to a source of compressed air for the tire chamber 5 and the chamber 5 defined by the emergency ring 4 are not illustrated. However, it is to be understood that the chamber 6 is under an overpressure to such an extent that when the tire 1 becomes defective, the zenith portion of the tire can sufficiently firmly rest on the ground-contacting area but can elastically rest on the emergency ring 4. At one spot of the emergency ring 4, if desired also on two or more spots of the circumference of the emergency ring 4, the latter is provided with two projections 7 of rubber or rubber-like material which are spaced from each other by a distance corresponding to the circumferential extension of a projection 7. The circumferential extension of each projection amounts to about from 2 to 5% of the ring along its outer circumference. The effective surface 8 of the projection, when viewed in cross section according to FIG. 1 has a curvature which is considerably less than the curvature of the emergency ring 4 proper. The radius r is considerably shorter than the radius R.

According to FIG. 2, the tubeless tire 1 is assumed to have become defective, for instance, by an unexpected perforation. In such an instance, the driving may be continued while the vehicle through the intervention of the emergency ring 4 rests on the zenith portion of the tire 1. In this connection, the emergency ring 4 flattens. The standing surface is designated with the numeral 9. This standing surface forms a secant to a circle which is determined by the outer circumference of the emergency ring 4. In this connection, it is of importance that the running-up flanks 10 of the projections 7 ascend in such a way that, as will be evident from FIG. 2, they are located in the extension of the secant or the standing surface 9. When the tire continues turning in the direction of the arrow 11, practically without deformation of the projection 7 the effective surface 8 in a jerk-like manner contacts the inner surface of the tire 1 so that so to speak an impact occurs and consequently not only a mechanical shock but also a corresponding noise. Briefly thereafter the second projection 7 comes into its effective position whereby the intensity of the warning signal is increased.

The configuration according to the invention of the running-up flank 10 thus brings about that the axis of rotation of the tire is in a shock-like and practically undiminished manner lifted by the deformation of the projections to a greater distance from the driving lane. These conditions normally prevail when the tangent T which is determined by the root of the running-up flank 10 forms with said running-up flank 10 an angle A which is within the range of from 20° to 50°, preferably, however, within the range of from 25° to 30°.

With protrusions which have a relatively large circumference, in other words, extend from about 8 to 10% over the circumference of the emergency ring 4, a dividing up of the projections by transverse grooves 12 is expedient. However, also in this instance, the running-up flanks 10 will have the configuration according to FIG. 2.

It is, of course, to be understood that the present invention is, by no means, limited to the specific showing in the drawings, but also comprises any modifications within the scope of the appended claims.

What we claim is:

1. A pneumatic vehicle tire with a tread area, which includes in combination: an inflatable emergency tube arranged inwardly of said pneumatic tire with that outer peripheral portion of said emergency tube which is adjacent to the tread area of said tire radially spaced from the inner periphery of said tire, said tire when deflated and contacting the ground under load being adapted to rest on said emergency tube while depressing the respective adjacent peripheral surface of said emergency tube so as to form a temporary flattened surface portion on said tube, said emergency tube comprising at least one peripheral protrusion with a running-up flank, said running-up flank when about suddenly to move noisily into said flattened surface being purposely located substantially in the elongation of an imaginary secant defined by said flattened surface portion, the tangent to the emergency tube through the root of the running-up flank forming with said running-up flank an angle A ranging from 20° to 50°, when viewing the cross section of said emergency tube the radius of said emergency tube being considerably less than the radius of the outer surface of said at least one protrusion.

2. A tire according to claim 1, in which said angle A ranges from 25° to 30°.

3. A tire according to claim 1, in which said at least one peripheral protrusion extends in the longitudinal direction of said tube by a distance equalling from about 2 to 10% of the outer circumference of said emergency tube.

4. A tire according to claim 1, in which said emergency tube has a plurality of peripheral protrusions arranged in groups, said groups extending over from about 8% to 15% of the outer circumference of said emergency tube.

5. A tire according to claim 1, in which said emergency tube has a plurality of peripheral protrusions and in which the spacing of successive protrusions in the circumferential direction of said emergency tube amounts to from one to three times the extension of one protrusion in the circumferential direction of said emergency tube.

6. A tire according to claim 1, in which said at least protrusion is provided with groove means extending transverse to the circumferential direction of said emergency tube.

7. A tire according to claim 6, in which said protrusions are by said transverse groove means divided into a plurality of successive humps.

* * * * *

UNITED STATES PATENT OFFICE
CERTIFICATE OF CORRECTION

Patent No. 4,121,640        Dated October 24, 1978

Inventor(s) Hermann Henning et al

It is certified that error appears in the above-identified patent and that said Letters Patent are hereby corrected as shown below:

[73] Assignee: Continental Gummi-Werke
Aktiengesellschaft, Hannover,
Fed. Rep. of Germany Signed and Sealed this Seventeenth Day of April 1979

[SEAL]

Attest:

RUTH C. MASON
Attesting Officer

DONALD W. BANNER
Commissioner of Patents and Trademarks